(12) United States Patent
Raikkonen et al.

(10) Patent No.: US 12,119,033 B1
(45) Date of Patent: Oct. 15, 2024

(54) BEAM BALANCER FOR OPTICAL DATA WRITING

(71) Applicant: Microsoft Technology Licensing, LLC, Redmond, WA (US)

(72) Inventors: Esa Tapani Raikkonen, Espoo (FI); Nikolai Chekurov, Helsinki (FI); Risto Heikki Mutikainen, Espoo (FI); Anton Viljami Autere, Jarvenpaa (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/472,124

(22) Filed: Sep. 21, 2023

(51) Int. Cl.
*G11B 7/126* (2012.01)
*G11B 7/0037* (2006.01)
*G11B 7/1374* (2012.01)

(52) U.S. Cl.
CPC ............ *G11B 7/126* (2013.01); *G11B 7/0037* (2013.01); *G11B 7/1374* (2013.01)

(58) Field of Classification Search
CPC ...... G11B 7/126; G11B 7/0037; G11B 7/1374
See application file for complete search history.

(56) References Cited

U.S. PATENT DOCUMENTS

| | | | |
|---|---|---|---|
| 2008/0192314 A1* | 8/2008 | Bates | G03H 1/26 |
| 2009/0196138 A1* | 8/2009 | Kaji | G11B 7/126 |
| 2009/0196142 A1* | 8/2009 | Yusu | G11B 7/126 |
| 2010/0135147 A1* | 6/2010 | Bard | G11B 7/0037 |
| 2012/0250480 A1* | 10/2012 | Kurokawa | G11B 20/10009 369/47.28 |

* cited by examiner

*Primary Examiner* — Andrew Sasinowski
(74) *Attorney, Agent, or Firm* — Alleman Hall & Tuttle LLP

(57) ABSTRACT

A method for balancing pulse energies across a series of write beams in an optical data writer comprises: (a) for each write beam of the series, applying an independently controllable phase delay to the write beam, thereby changing the polarization of the write beam; and (b) for each write beam with changed polarization in the series, directing a selected plane-polarized component of the write beam through a data modulator and onto an optical substrate. In this method the data modulator modulates each write beam of the series irrespective of the tolerance across the series of write beams.

20 Claims, 11 Drawing Sheets

BEAM BALANCER FOR OPTICAL DATA WRITING

BACKGROUND

High-power, short-pulse, laser radiation can be used to write and store data in a dielectric optical substrate. The radiation induces, at its focus, long-lived or permanent structural and optical changes within the substrate due to non-linear (e.g., two-photon) absorption by the substrate medium. In some cases, a nanoscale 3D structure with grating-like optical properties is formed at the focus. The term 'voxel' is used herein to refer to an individual locus of this or any other optical change within a optical substrate, which is useful for storing data.

SUMMARY

One aspect of this disclosure relates to a method for balancing pulse energies across a series of write beams in an optical data writer, wherein the pulse energies of each of the write beams are equal to within a tolerance. The method comprises: (a) for each write beam of the series, applying an independently controllable phase delay to the write beam, thereby changing the polarization of the write beam; and (b) for each write beam with changed polarization, directing a selected plane-polarized component of the write beam through a data modulator and onto an optical substrate. In this method the data modulator modulates each write beam of the series irrespective of the tolerance.

Another aspect of this disclosure relates to an optical data writer comprising a laser, a beam splitter, a beam balancer, and a data modulator. The laser is configured to emit pulsed radiation. The beam splitter is configured to divide the pulsed radiation into a series of write beams, wherein the pulse energies of each of the write beams are equal to within a tolerance. The beam balancer is configured to balance the pulse energies across the series of write beams; it includes a thermo-optical phase-retarder array and a polarization selector. The data modulator is configured to modulate independently the pulse energies of each write beam of the series at a modulation frequency. The scanner is configured to vary the relative position of each write beam of the series relative to an optical substrate.

Another aspect of this disclosure relates to a method for making a beam balancer of an optical data writer. The method comprises: (a) forming a series of waveplates side-by-side in a birefringent optical substrate; (b) for each waveplate of the series, depositing a thin-film resistor on at least one side of the birefringent optical substrate, in intimate thermal contact with the waveplate; (c) for each waveplate of the series, forming a thermally insulating zone around the thin-film resistor of the waveplate; and (d) arranging a polarization selector optically downstream of the birefringent optical substrate.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

The pulse energies of the parallel write beams of an optical data writer should be balanced upstream of the data modulator. Otherwise a portion of the available modulation depth of the data modulator would have to be used to compensate for the pulse-energy tolerance across the series of write beams. This disclosure provides an efficient beam-balancing method, a thermo-optical beam balancer applicable to the method, and a method of fabrication of the thermo-optical beam balancer.

An important component of the thermo-optical beam balancer herein is a phase-retarder array, which, in combination with a downstream polarization selector, provides individually controllable optical loss across the series of write beams. Manufactured via laser-ablation cutting and/or other suitable processing, the phase-retarder array is a low-cost alternative to competing technologies. This component has low power requirements, low environmental sensitivity, a high damage threshold and long usable lifetime, and low insertion loss when configured with a suitable anti-reflection (AR) coating. The individual beam-retarding elements of the phase-retarder array can be densely packed on a single (e.g., monolithic) substrate, thereby preserving write-beam parallelism among the different write beams, where the beam pointing error is the same or nearly so for all beams.

Although balancing each of the parallel write beams to the same pre-modulation pulse energy is a valuable objective, the solutions herein can also be used to apply a controlled differential offset to each of the write beams individually. In other words, a 'beam balancer' need not 'balance' the pulse energies of all beams to exactly the same pulse energy in every implementation; the terms 'balance' and 'balancer' should be interpreted in that spirit.

Figure 1:
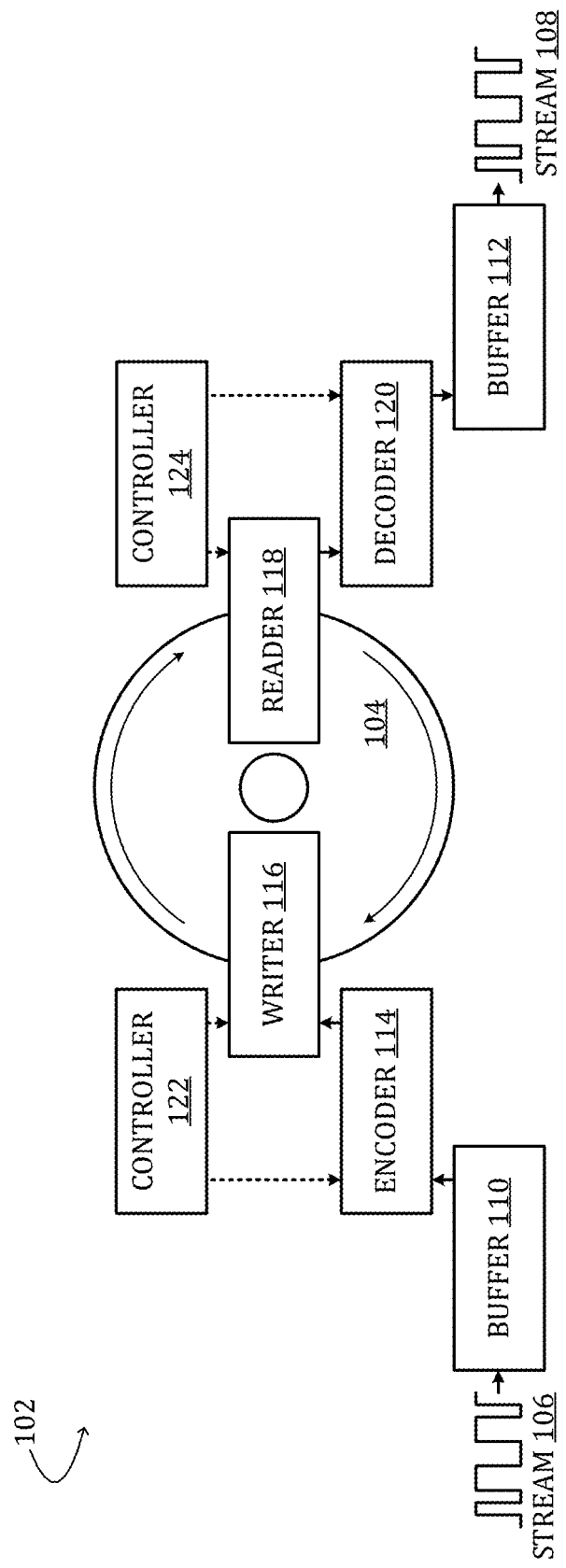
FIGS. 1 and 2 show aspects of an example data storage and retrieval system.
Figure 2:
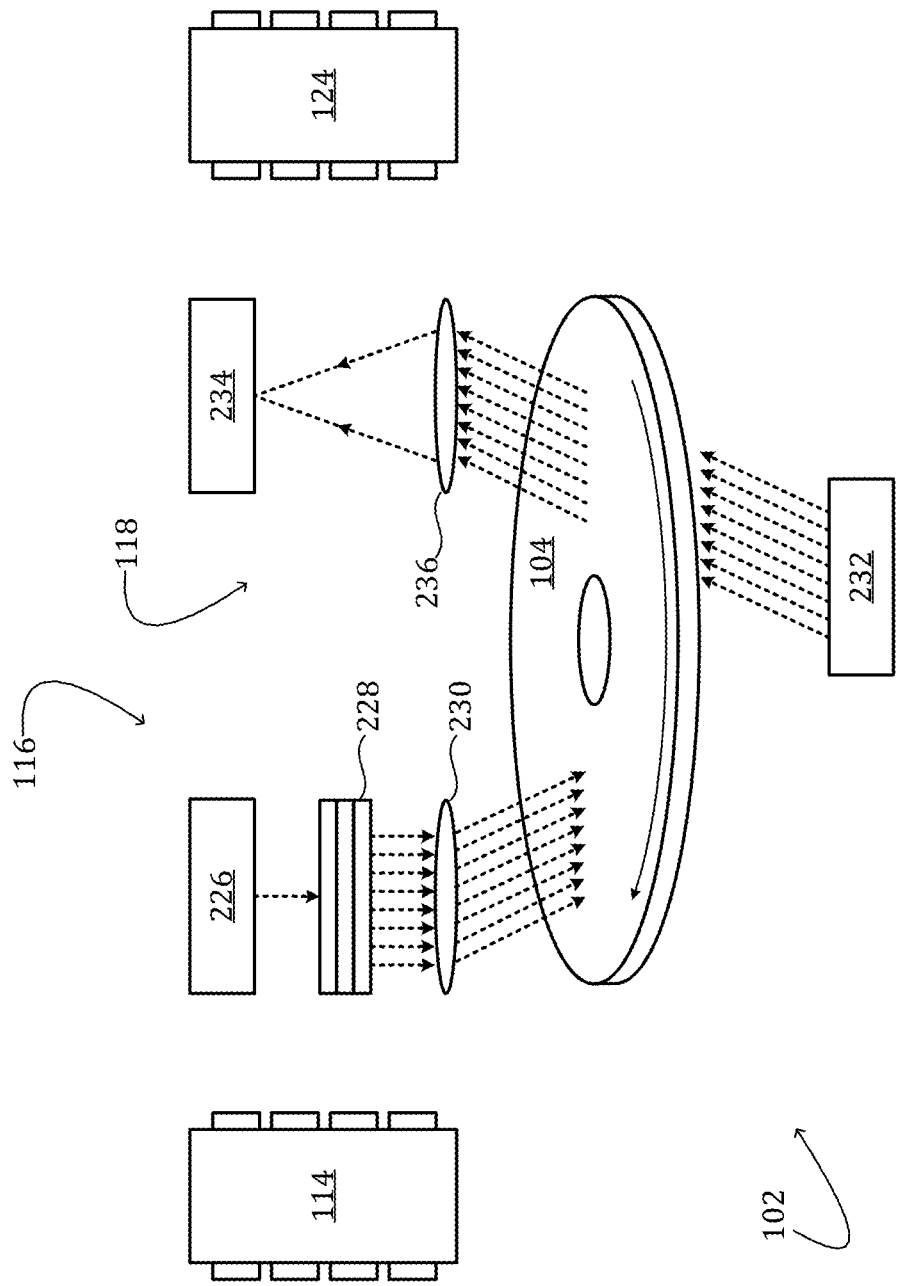

Turning now to the drawings, FIGS. 1 and 2 show aspects of an example data storage and retrieval system 102. The illustrated system is an integrated read-write system, capable of data-storage and data-retrieval operations. Such a system may be used in a data server, for example. Other systems equally consonant with this disclosure may be write-only, the complementary read process enacted elsewhere. A write-only system may be used to write data for media-content distribution, for example.

System 102 includes optical substrate 104, which may or may not be removable from the system. The optical substrate may differ from one example to the next, but generally comprises a solid dielectric. In some examples, the optical substrate may comprise an inorganic glass, such as silica glass. In other examples, the optical substrate may comprise a transparent ceramic or a polymer. In some examples, the optical substrate may include a relatively thin layer (e.g., 30 to 300 microns thick) coupled to a mechanically stable supporting layer. In the illustrated example, the optical substrate takes the form of a disc, but that aspect is not necessary. Alternative geometric forms of the optical substrate include blocks, slabs, and tapes.

System 102 is configured to receive a write stream 106 of digital data and to release a read stream 108 of digital data. Data from the write stream may be buffered in write buffer 110 prior to being written to optical substrate 104. Likewise, data read from the optical substrate may be buffered in read buffer 112 prior to being released into the read stream. Encoder 114 is configured to enact the logical encoding operation that converts the buffered data into control signal, which is furnished to optical data writer 116. The optical data writer includes componentry that writes the buffered data to the optical substrate in the form of optical perturbations (vide infra) according to the control signal. Optical data reader 118 includes componentry that probes the optical substrate to sense the optical perturbations effected by a previous write operation. In doing so, the optical data reader generates sensory signal, which is received in data decoder 120. The data decoder is configured to enact the logical decoding operation that converts the sensory signal from the optical data reader back into the previously stored data. Write controller 122 and read controller 124 supply, respectively, write parameters to the encoder and optical data writer, and read parameters to the data decoder and reader. In some implementations, controllers 122 and 124 may be combined.

In optical data writer 116, high peak-power, short-pulse laser radiation is used to write and store data in optical substrate 104. In some examples the radiation induces, at its focus, a long-lived or permanent structural perturbation in the optical substrate, due to non-linear (e.g., two-photon) absorption by the substrate medium. The term 'voxel' refers to an individual data-storage location comprising this or any other induced perturbation within the optical substrate. A voxel can store data in various forms. In principle, any of the Muller-matrix coefficients of the substrate medium can be manipulated and used to encode data. In some examples, a nanoscale 3D structure with grating-like optical properties is formed at the focus of the radiation. In some examples the optical perturbation written at each voxel can be modeled as a waveplate of a retardance $8d$ and slow-axis orientation $\varphi$.

In some examples both the slow-axis orientation and the retardance (the 'birefringence', collectively) are modulated so as to encode data. When data is written in that way, the polarization angle of the write beam determines the orientation q of the waveplate grating, while the intensity of write beam determines the strength of the grating. In other examples the polarization angle is fixed and only the write beam intensity is modulated. In still other examples the write beam intensity is fixed and only the polarization angle is modulated. By dividing the continuous space of achievable slow-axis orientations and/or retardances into discrete intervals, multi-bit data values can be encoded into each voxel—viz., by independently coercing the birefringence of that voxel to within one of the discrete intervals. In this manner, each voxel may encode one of R different retardance states at each of Q different polarization angles. In examples particular to this disclosure, the polarization angle is fixed and only the write beam intensity is modulated.

Write parameters supplied by controller 122 may define the configuration of voxels of optical substrate 104. In some examples the voxels are arranged in parallel layers spaced within the depth of the optical substrate (e.g., in a direction normal to the read/write surface of the optical substrate). The write parameters may specify the number of layers, the depth of each layer, and/or the detailed arrangement of voxels within any layer.

In the configuration shown in FIG. 2, the radiation source for optical data writer 116 is laser 226. The laser is configured to emit a repeating pulse train of pulsed radiation. The wavelength band of the radiation is not particularly limited, though wavelengths in the range of 350 to 1600 nanometers (nm)—e.g., 515 or 1030 nm—are typical. In some examples the radiation pulses may be sub-picosecond pulses—e.g., tens to hundreds of femtoseconds in duration. The duty cycle of the pulse train is not particularly limited, but pulse frequencies of tens to hundreds of MHz are typical. In some examples, the laser may be one or more of Q-switched and mode-locked, to provide very brief pulses of very high energy. Other forms of laser radiation are also envisaged.

To achieve acceptably high data-writing bandwidth the radiation used to write the data is split into a plurality of independently modulated write beams, so that a plurality of voxels can be written concurrently. In this approach, the pulse energy of each write beam is controlled independently via multichannel data modulator 228. Encoder 114 provides electronic signal to the data modulator that defines the data to be carried over each write beam. Downstream of the data modulator, each write beam is focused onto a corresponding voxel of optical substrate 104.

Depending on the implementation, portions of optical data writer 116, optical substrate 104, or both may be coupled mechanically to a scanner (not shown in FIG. 2). The scanner is configured to change the relative positioning of the write beams relative to the optical substrate, so that all of the voxels of a given layer can be addressed. In examples in which data is to be written to a plurality of layers within optical substrate 104, optical data writer 116 may include an adjustable objective-lens system 230. The adjustable objective-lens system is configured to focus the write beams emerging from data modulator 228 to a selected depth layer of the optical substrate.

Optical data reader 118 of data storage and retrieval system 102 includes optical probe 232 and camera 234. The optical probe may include a diode laser, super-luminescent diode laser, laser-excited fluorescent light source, or other polarized or non-polarized, light source. Camera 234 may include a high-resolution/high frame-rate CMOS or other suitable photodetector array. The camera is configured to image light from optical probe 232 after such light has interacted with the written voxels of optical substrate 104. Although FIG. 2 shows transmission of light rays through the optical substrate and into the camera, the light rays may, in alternative configurations, reach the camera by reflection from the optical substrate.

Camera 234 may resolve localized intensity in corresponding pixel arrays of its captured image frames. In examples in which data is to be read from a plurality of layers of optical substrate 104, optical data reader 118 may include an adjustable collection-lens system 236. The adjustable collection lens system may collect light rays diffracted from a selected depth layer of the optical substrate, and reject other light rays. In other examples lensless imaging based on interferometry may be used.

Decoder 120 of optical data reader 118 is configured to receive the captured images from camera 234 and to enact the image processing necessary to retrieve the data stored in optical substrate 104. Such data may be decoded according to a canonical method in which an observable physical property is connected through one or more intermediates to the data read from the optical substrate. Alternatively the data may be decoded according via a machine-learning method trained to directly generate decoded data based on component-image data.

For ease of illustration, FIGS. 1 and 2 show a spinning optical substrate 102, which periodically brings each voxel into the paths of the read and write beams. That aspect is not necessary, however, as various other scanning mechanisms are equally contemplated. For instance, in one alternative the beams are scanned in a given direction from a rotating polygon mirror and suitably adapted focusing optics, as the optical substrate moves laterally in another direction.

In order to enable acceptably high data-writing bandwidth, an optical data writer should be deeply parallelized, operating a series of write beams concurrently in a suitable beam-array pattern. Furthermore, each write beam should operate at the highest modulation frequencies available with state-of-the-art optical modulators, and the storage density should be maximized by encoding data into multi-valued voxels. Opposing each of the foregoing objectives are the manufacturing and operational tolerances of the optical componentry-beam splitters, coatings, lenses, etc. In particular, optical losses among split, parallel write beams emerging from a beam splitter may vary considerably, such that the modulated pulse energy for writing a given voxel value must also vary. In general, the power delivered by each write beam may differ by an unknowable offset, may be subject to unknowable low-frequency drift, and may differ unknowably in the gradient of its response function.

Figure 3:
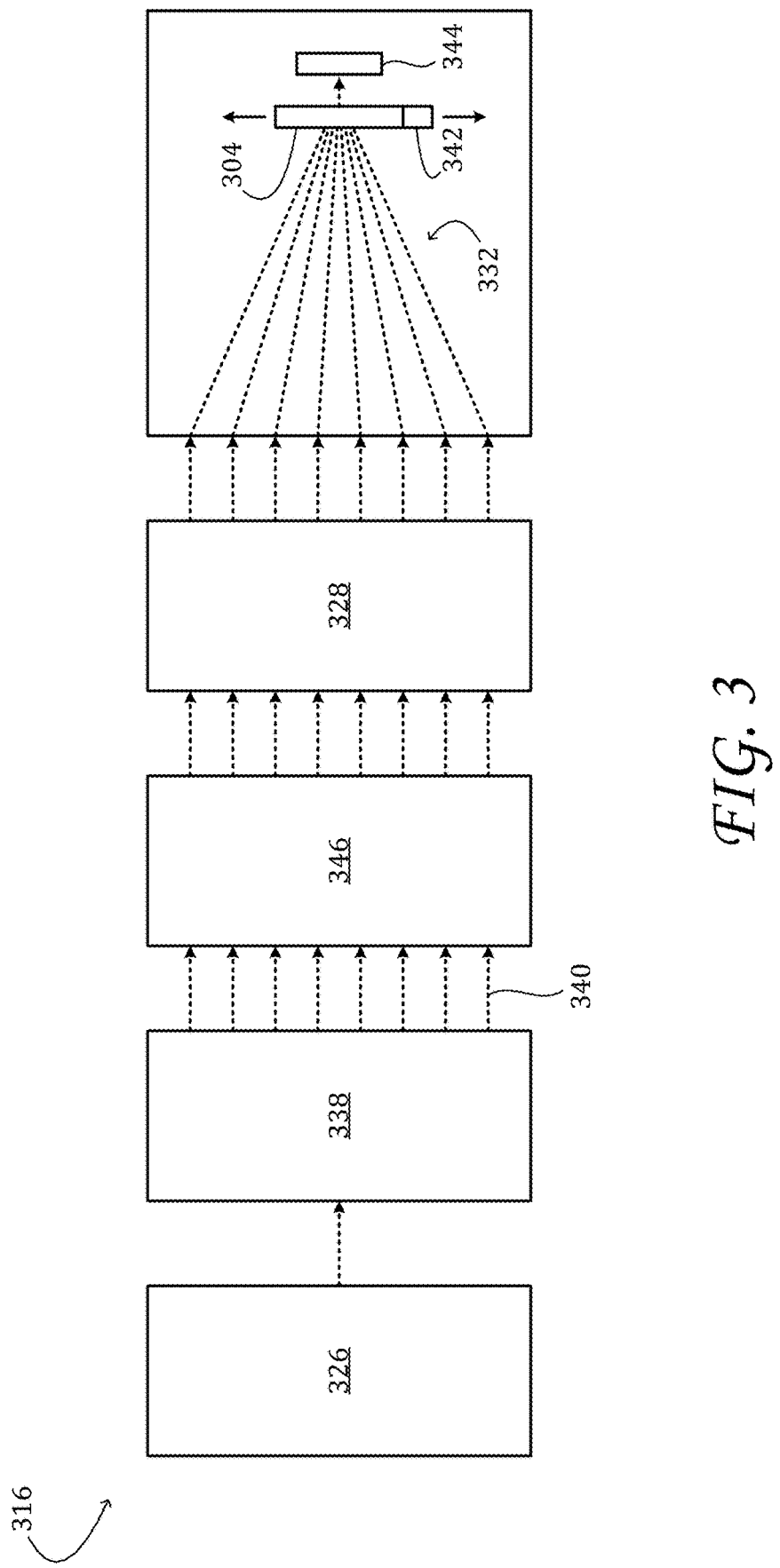
FIG. 3 shows aspects of an example optical data writer of a data storage and retrieval system.

The objectives and obstacles noted above are illustrated more concretely with reference to FIG. 3, which shows additional aspects of example optical data writer 316 of a data storage and retrieval system. Optical data writer 316 includes beam splitter 328 in addition to laser 326, data modulator 328, and objective-lens system 332.

Beam splitter 338 is configured to divide the pulsed radiation from laser 326 into a series of write beams 340. For ease of illustration, FIG. 3 shows eight write beams emerging from beam splitter 338; the actual number of write beams is not limited to eight and may differ from one implementation to another. Each write beam of the series delivers a series of photon pulses, each pulse having energy greater than about five nanojoules. Pulse energies in this range can initiate multiphoton absorption in silica glass and/or other optical substrates.

Data modulator 328 is configured to modulate independently the pulse energies of each write beam 340 of the series of write beams. As noted hereinabove, the data modulator is controlled by control signals from an encoder and write controller of the optical data writer, and objective-lens system 332 is configured to focus each write beam of the series into optical substrate 304. Scanner 342 is configured to vary the relative position of each write beam of the series relative to the optical substrate.

Generally speaking, the pulse energies of each of the write beams 340 are equal to within a tolerance. In some examples the tolerance may be ±5%; in some examples the tolerance may be ±2%. Other tolerances and tolerance ranges are also envisaged. In any scenario in which the tolerance is greater than zero, the actual, unmodulated pulse energy of a given write beam i is the sum of a set-point pulse energy $E_i$ plus an offset $\delta_i$. In many examples the set-point pulse energy is the same across the series of write beams, while the offset may vary across the series of write beams. In some scenarios, the different offsets may originate from structural asymmetries or manufacturing tolerances of the optical data writer (in beam splitter 338, e.g., or other componentry). Write beams at the periphery of the series may suffer greater losses and optical aberrations than write beams in the middle of the same series, for instance.

In some examples each offset $\delta_i$ has a time-invariant component $\delta_{i,0}$ due to the structural asymmetries or manufacturing tolerances noted above. The term 'd.c. offset' can be used to refer to the time-invariant component $\delta_{i,0}$. In addition, the pulse energies of any, some, or all of the write beams 340 may be subject to drift. In other words, the value of an offset $\delta_i$ may increase or decrease over time, such that $\delta_i = \delta_{i,0} + f(t)$, or $\delta i = \delta_{i,0} + f'(\omega)$ in the frequency domain. The drift may be due to temperature change, humidity change, uncompensated changes in a control or power-supply voltage, etc. Generally speaking, the rate and direction of the drift may differ across the series of write beams. The drift rate for a given write beam 340 is typically very low relative to the rate at which data modulator 328 modulates the pulse energy of the write beam. Expressed in the frequency domain, the drift frequency may be at least four orders of magnitude lower than the modulation frequency.

Although the offsets of write beams 340 are not knowable a priori, they are readily measurable. Referring again to FIG. 3, optical data writer 316 includes a sensor 344 responsive to the pulse energies of each write beam of the series. The sensor may be configured to quantify light that passes through optical substrate 304, or is scattered from any point in the optical paths of the write beams, to thereby provide an accurate estimate of the pulse energy when only one of the write beams is energized. In this manner the effect of any offset &i can be compensated by controlled, beam-wise attenuation of each, individual write beam.

In principle, the data modulator of the optical data writer can be used to enact the compensation. That approach would be a poor use of resources, however. All data modulators have a finite modulation depth. If any portion of the modulation depth is used for d.c. or low-frequency compensation, then that portion will not be available for writing data. This calculus is especially relevant for high-bandwidth optical writing because every bit of modulation depth of a high-speed data modulator is expensive. The solutions herein recognize that the desired write-beam compensation can be achieved instead using a low-cost, low-bandwidth beam balancer.

Figure 4:
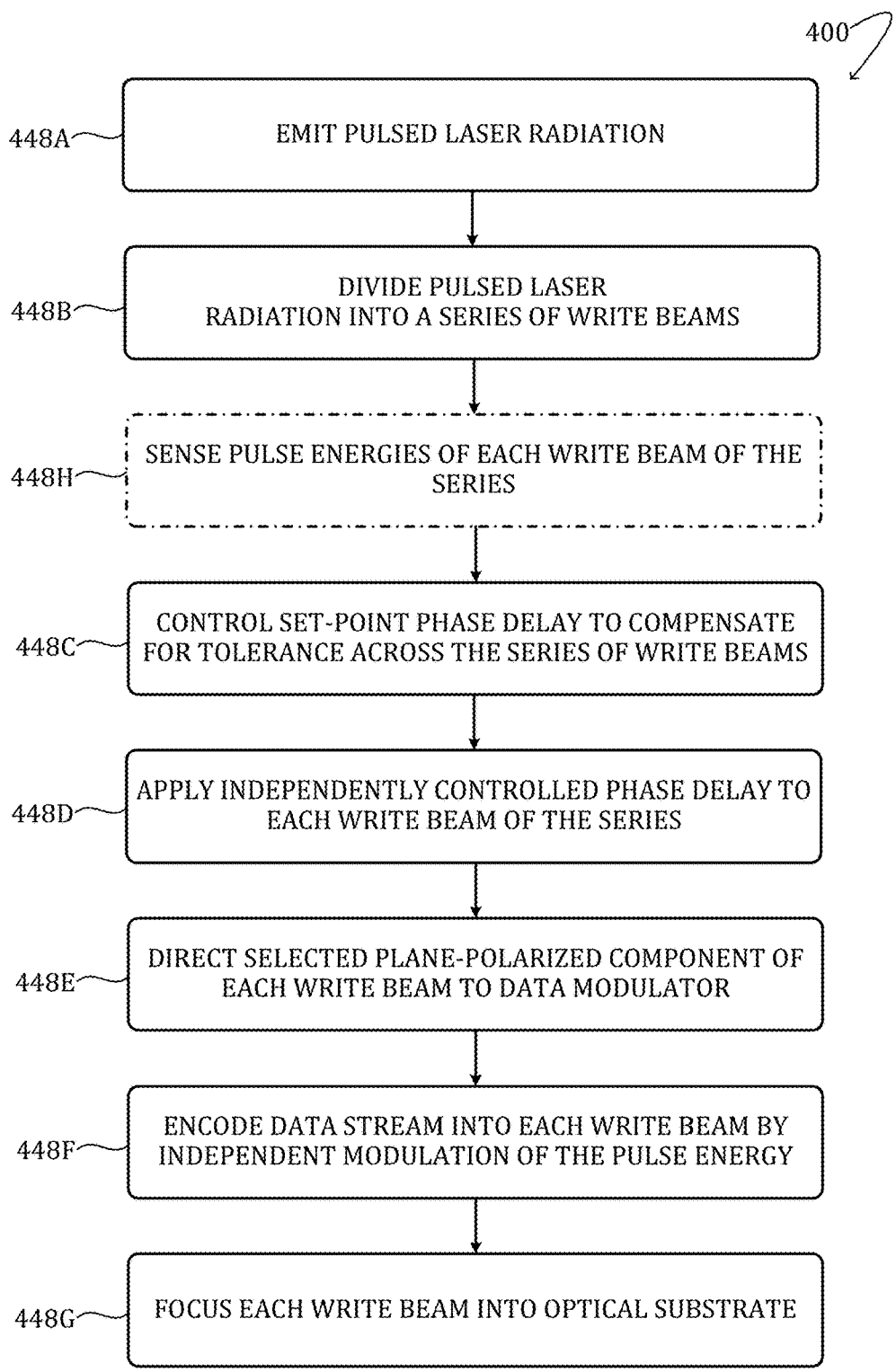
FIG. 4 shows aspects of an example method for balancing pulse energies across a series of write beams in an optical data writer.

In view of the analysis above, optical data writer 316 of FIG. 3 includes a beam balancer 346. The beam balancer is configured to balance the pulse energies across the series of write beams 340. The function of the beam balancer is illustrated in FIG. 4, which shows aspects of an example method 400 for balancing pulse energies across a series of write beams in an optical data writer.

At 448A of method 400, a laser of an optical data writer emits pulsed laser radiation. At 448B a beam splitter of the optical data writer divides the pulsed laser radiation into a series of write beams, where the pulse energies of each write beam across the series are equal to within a tolerance.

At 448C a controller of the optical data writer independently controls a set-point phase delay to be applied, respectively, to each write beam of the series, so as to compensate for the tolerance. In examples in which the pulse energies of the write beams are subject to drift (from the beam splitter or from any other component of the optical data writer), the set-point phase delay may be controlled so as to further compensate for the drift.

At 448D a beam balancer of the optical data writer applies the respective, independently controlled phase delays to each write beam of the series, changing the polarization ellipticity of each write beam by a controlled amount and sending each write beam through a polarization selector. Generally speaking the phase delay may be applied electro-optically, acousto-optically, thermo-optically, or in any other suitable manner. At 448E the beam balancer directs the selected plane-polarized component of each write beam through a data modulator of the optical data writer.

At 448F the data modulator encodes a stream of data into each write beam by independent modulation of the pulse energies of each write beam of the series. In this method the data modulator modulates the pulse energies of each write beam of the series irrespective of the tolerance noted above. At 448G an objective-lens system of the optical data writer focuses each write beam into an optical substrate, thereby writing the desired data into the optical substrate.

At optional step 448H of method 400, a sensor senses the pulse energies of each write beam of the series. In examples where pulse energies are sensed, the set-point phase delay controlled at 448C may be controlled in a closed-loop manner further based on the pulse energies here sensed. In other examples the sensory and set-point control steps may be enacted in a calibration phase before any data writing is attempted.

In the manner summarized in FIG. 4, variable optical loss across a series of write beams can be achieved using a variable phase retarder arranged optically upstream of a polarization selector. The polarization state of a linearly polarized input write beam is modified by the retarder, and only one linear polarization direction is passed by the polarization selector. Loss modulation is achieved, accordingly, by adjustment of the phase retardance. In some examples the variable optical-loss beam balancer may be used to compensate both the d.c. offset and low-frequency drift of an optical data writer, as noted above.

In some examples a variable phase retarder may comprise one or more electro-optical crystals (as many as four per channel), which must be driven by high voltage. In other examples a variable phase retarder may comprise a continuously rotating waveplate—e.g., a piece of birefringent material coupled to a mechanical rotation stage, or an acousto-optical (AOM) modulator. Electro-optical and rotating-waveplate configurations are indeed suitable for individual beam lines, but less suitable for a densely packed write-beam array configuration, where the beam-to-beam separation is comparable to the beam diameter. (Indeed the required parallelism within the beam group could be lost if discrete components with typical manufacturing tolerances where used in lieu of the solutions herein.) Moreover, the use of high voltage or rotating mechanics on the millimeter scale is technically challenging and expensive. In principle, AOM arrays are suitable for both data-modulation and beam-balancing functions, but are much too expensive for redundant use in an optical data writer.

Figure 5:
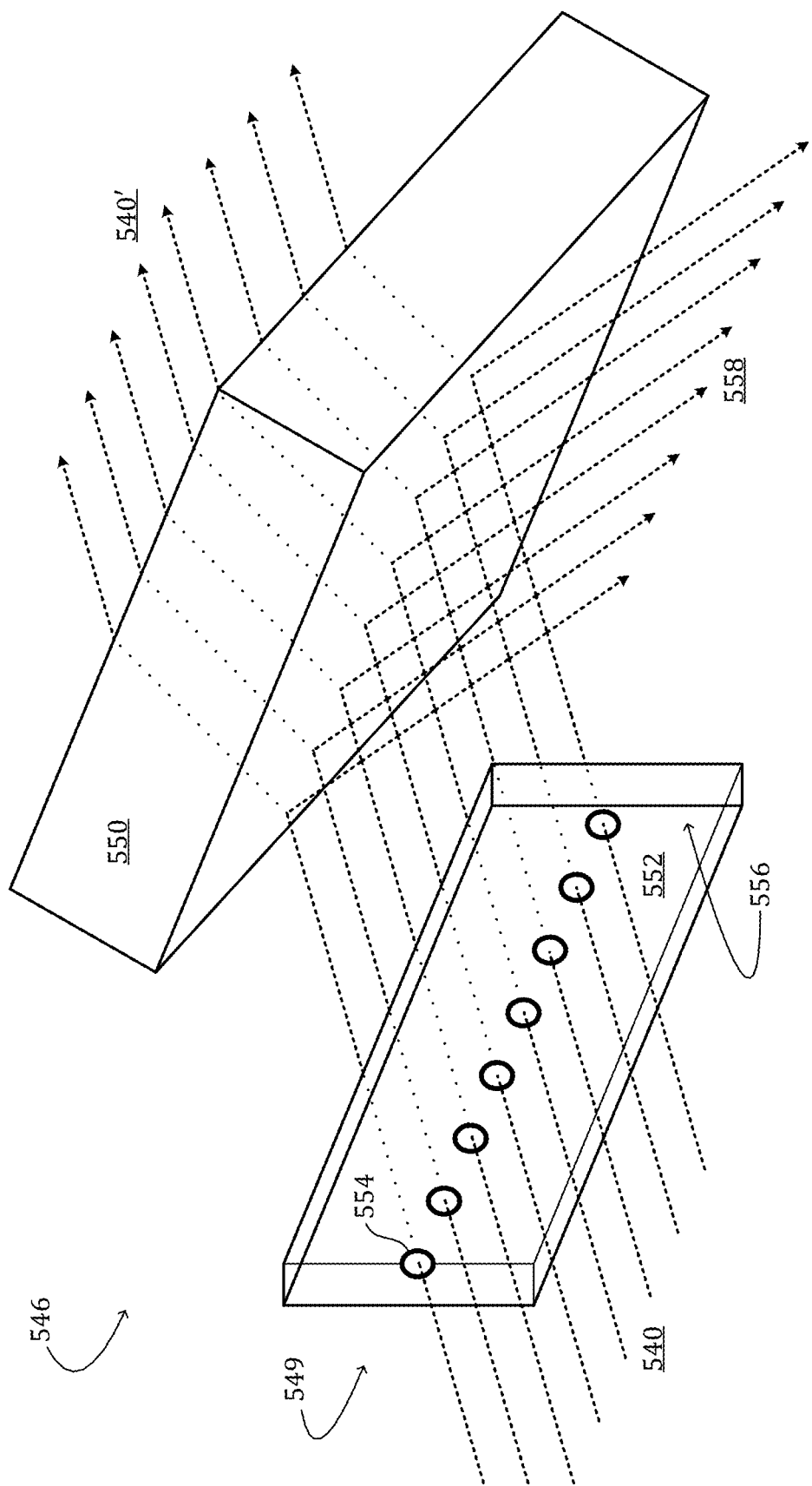
FIG. 5 shows aspects of an example beam balancer of an optical data writer.

In view of the foregoing analysis, FIG. 5 shows aspects of an example beam balancer 546 of an optical data writer. The beam balancer is configured to balance the pulse energies across the series of write beams emerging from the beam splitter of an optical data writer. To that end, beam balancer 546 includes thermo-optical phase-retarder array 549 and polarization selector 550.

Phase-retarder array 549 comprises a birefringent, uniaxial crystal 552 which is substantially transparent in the emission band of the laser. In some examples the uniaxial crystal may comprise quartz or yttrium vanadate. Capable of transmitting high-energy pulses of narrow diameter, these materials have a very high damage threshold. In the example shown in FIG. 5, the series of write beams 540 traverse phase-retarder array 549 at a corresponding series of loci 554. In some examples, the same crystal confines each locus of the series of loci; in other words, the phase-retarder array can be monolithic. In other examples, the phase-retarder array may comprise a plurality of crystals bonded together, with like crystal axes mutually aligned. In some examples entry face 556 of the phase-retarder array supports an anti-reflective (AR) coating configured to suppress optical insertion losses. In some examples each locus 554 of the series of loci has independent heating.

Polarization selector 550 of beam balancer 546 is arranged optically downstream of phase-retarder array 549. The polarization selector diverts non-selected laser emission 558 from the series of write beams 540 and transmits attenuated write beams 540'. The polarization selector may take the form of a plate polarizer that transmits light of predetermined plane polarization and rejects all other polarization components. The phase-retarder array and the polarization selector achieve, in combination, the beam-wise adjustable loss function of beam balancer 546. In some examples the polarization selector may comprise a single polarizing-plate beam splitter used at Brewster's angle, thereby ensuring maximal transmittance and extinction ratio, and minimal pointing-direction error among write beams 540. An ion-beam sputtering (IBS) coating on the polarizing plate can be used to achieve this function. In examples where the phase-retarder array comprises a quartz crystal and the polarization selector comprises a fused-quartz polarizing plate, the two components can be combined into a substantially monolithic assembly, for especially rugged construction.

The thermo-optical function of phase-retarder array 549 is based on the different thermal dispersion coefficients of the ordinary and extraordinary waves propagating in the birefringent optical-substrate material. The incident polarization excites ordinary and extraordinary waves of the same amplitude inside the birefringent crystal. The phase retardance between these polarization components is $$\delta = |\varphi_e - \varphi_0| = \frac{2\pi}{\lambda}(n_e(\lambda, T) - n_0(\lambda, T))z(T),$$

where $\lambda$ is the operating wavelength, $z(T)$ is the thickness of the crystal, and $n_e(\lambda, T)$ and $n_0(\lambda, T)$ are the extraordinary and ordinary refractive indices of the crystal as functions of wavelength $\lambda$ and temperature T. The crystal length is also a function of temperature; it is assumed that the linear thermal expansion is described by $$z(T)=z_0(1+\alpha_0(T-T_0)),$$

where $\alpha_0$ is the thermal expansion coefficient in the direction of the optical axis, and T and $T_0$ are the actual and reference (zero-loss) temperatures.

The birefringent crystal acts as a thermo-optic phase retarder (i.e., thermo-optic waveplate), which modifies the polarization state of the transmitted light. The polarization modulation is transformed into a power modulation by the downstream polarizer. The equation for polarizer transmittance is $$T = \frac{1}{4}((\cos\delta - 1)^2 - \sin^2\delta).$$

For the zero-loss state the phase-retarder is set at $\delta=\pi$ (+m·2π) operating point, where m is the waveplate order.

There it acts as a half-wave plate that rotates the incoming horizontal linear polarization by 90 degrees, and the beam passes through the subsequent vertical polarizer without loss. (It will be noted, however, that the solution is not limited to these directions.) When the phase-retardance is not a multiple of $\pi$ the polarization state is generally elliptic, and the horizontal component is reflected off by the polarizer, which generates the adjustable optical loss.

Zero-loss at the chosen temperature is acquired by selecting the length of the crystal as given by the equation $$z_m(\lambda, T_0) = (2m+1)\frac{\lambda}{2(n_e(\lambda, T_0) - n_0(\lambda, T_0))},$$

where $\lambda$ is the operating wavelength, $T_0$ is the chosen operating temperature for zero-loss, and m is the waveplate order.

The thermal sensitivity of loss modulation is defined by the material choice and retarder order—e.g., its length. The equation for calculating thermal sensitivity is $$\frac{d\delta}{dT} = \frac{2\pi}{\lambda} z_m(\kappa_e n_e - \kappa_0 n_0 + \alpha_0(n_e - n_0)),$$

where $$\kappa_e = \frac{dn_e}{dT}$$

and $$\kappa_0 = \frac{dn_0}{dT}$$

are the thermo-optical coefficients of the crystal for the extraordinary and ordinary directions, and do is the thermal expansion coefficient normal to the crystal faces. According to the previous equation for $d\delta/dT$, the thermal sensitivity of the retarder is inversely proportional to the operating wavelength and the waveplate length multiplied by the material dependent factor $$\eta = \kappa_e n_e - \kappa_o n_o + \alpha_o(n_e - n_o).$$

At around T=20° C. the thermal sensitivity factors for yttrium orthovanadate (YVO) and quartz are, at $\lambda$=515 nm, $$\eta_{YVO} = 3 \cdot 10^{-6} \frac{1}{K} \cdot 2.260 - 8.85 \cdot 10^{-6} \frac{1}{K} \cdot 2.025 +$$
$$4.43 \cdot 10^{-6} \frac{1}{K} \cdot (2.26 - 2.025) = -10.1 \cdot 10^{-6} \frac{1}{K}$$

$$\eta_{quartz} = -6.3 \cdot 10^{-6} \frac{1}{K} \cdot 1.557 +$$
$$5.2 \cdot 10^{-6} \frac{1}{K} \cdot 1.548 + 14 \cdot 10^{-6} \frac{1}{K} \cdot (1.557 - 1.548) = -1.6 \cdot 10^{-6} \frac{1}{K}.$$

The relative tuning sensitivity is 6.3—i.e., YVO has more than six times the thermal tuning sensitivity of quartz. However, the high birefringence ($n_e - n_o$) of YVO requires the crystal length to be controlled at high enough precision.

That issue can be partly addressed by the fast thermal tuning: any cut tolerance can be compensated by a shift in zero-loss operating temperature.

In view of the analysis above, the default, zero-loss input polarization direction is 45 degrees to the crystal axis, where the input pulse energy is split evenly between the ordinary and extraordinary waves. The thermal sensitivity of polarization-ellipticity change in phase-retarder array 549 is a function of the crystal thickness, crystal material, and crystal-cut direction, as noted above. The table below shows selected thermo-optical properties of crystalline quartz as a function of waveplate order. Based on the third data row of the table, a 1143-micron quartz retarder can generate 10% optical loss when heated 28° C. Still greater thermal sensitivity may be available with crystals of higher birefringence—e.g., yttrium-vanadate. More generally, the AT is relative to the chosen zero-loss operating temperature, which is realized by cutting the crystal to the appropriate length, as described herein.

| Order | Thickness/μm | Thermal Coefficient/° C.$^{-1}$ | $\Delta T_{dP\,=\,10\%}$ /° C. |
|---|---|---|---|
| 0 | 27.88 | 0.0001 | >100 |
| 1 | 83.65 | 0.0003 | >100 |
| 10 | 585.5 | 0.0021 | 55 |
| 20 | 1143.2 | 0.0042 | 28 |
| 30 | 1700.9 | 0.0062 | 19 |

To enable the thermo-optical control feature, the write controller of an optical data writer can be configured to control the independent heating of each locus 554 of phase-retarder array 549. In some examples the controller may be configured to control the independent heating in closed loop manner based on the output of a sensor (e.g., sensor 344 of FIG. 3), so as to balance the pulse energies across the series of write beams. The detailed manner of independent temperature control across the series of loci 554 is not particularly limited. In some examples the loci may be heated radiatively, using focused emission from one or more other (e.g., infrared) lasers. In other examples the loci may be heated resistively.

Figure 6:
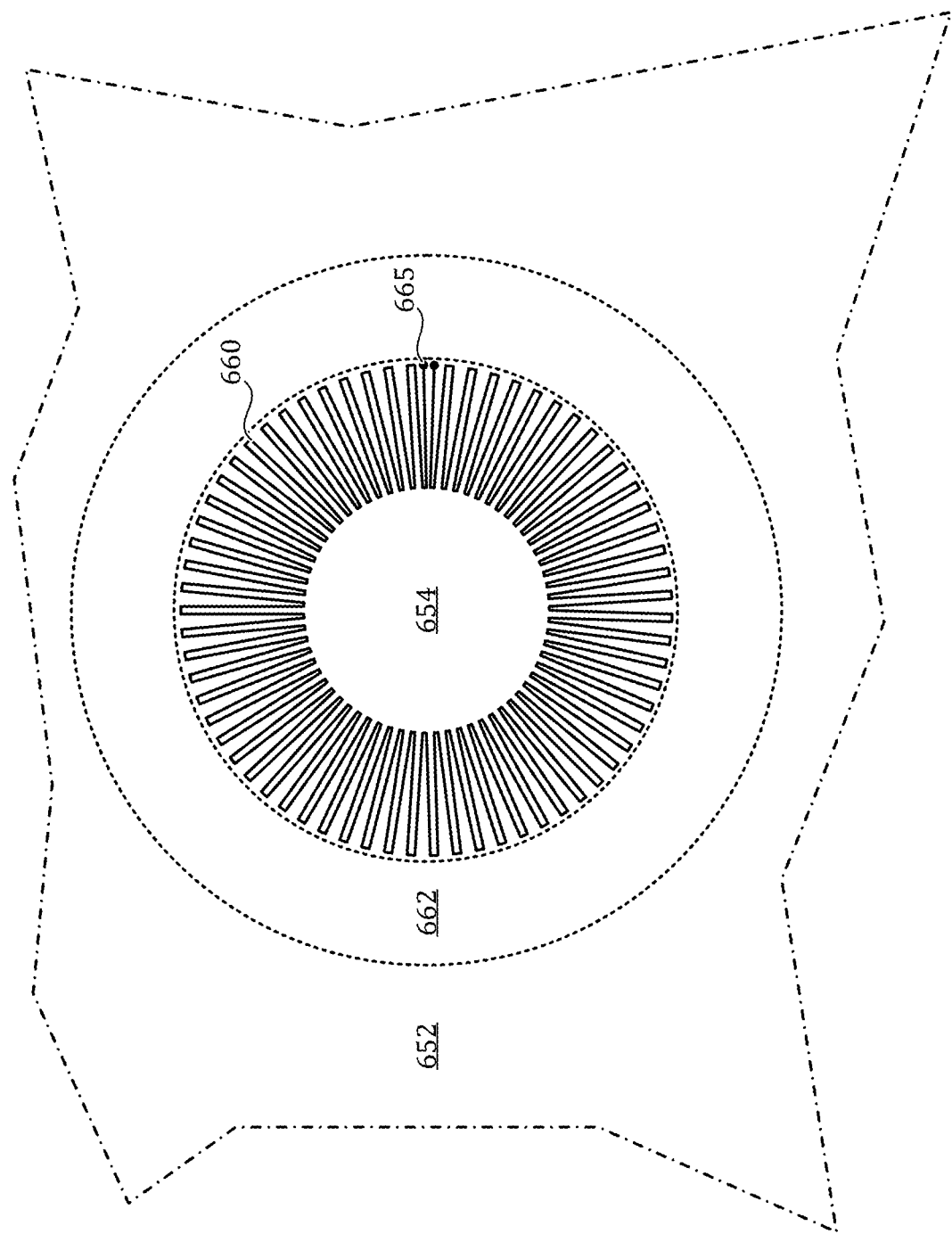
FIGS. 6 and 7 show aspects of example loci of a phase-retarder array of a beam balancer.

In order to illustrate the resistive-heating approach, FIG. 6 shows aspects of an example locus 654 of a phase-retarder array of a beam balancer. In this and other examples, the resistive heating comprises, for each locus of the series of loci on birefringent crystal 652, at least one thin-film resistor 660 arranged in intimate thermal contact with the locus to be heated. Thin-film resistor 660 of FIG. 6 is an annular thin-film resistor, which surrounds locus 654 on the crystal face that receives the input write beam. In the illustrated example, an annular thermally insulating zone 662 surrounds the thin-film resistor. In some examples the thermally insulating zone comprises a thermally insulating material. In some examples the thermally insulating zone comprises primarily an air gap.

Figure 7:
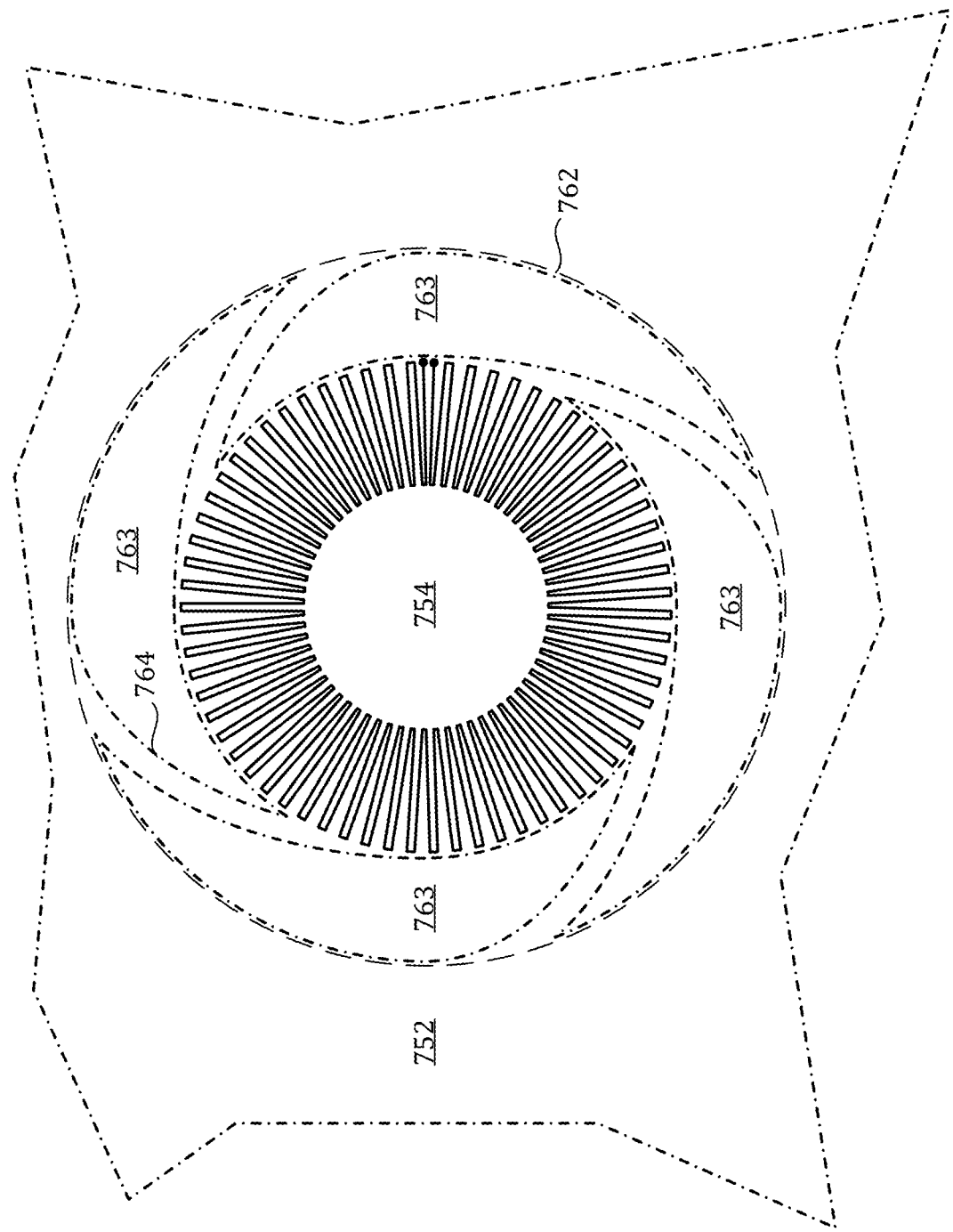

In examples in which the thermally insulating zone comprises primarily an air gap, the solid material proximate to each locus may be connected to the surrounding solid by relatively narrow, bridge-like supporting structures. The narrow dimensions of the supporting structures limit the diffusion of heat from the heated area proximate to each locus and into the surrounding solid, and, by extension, to the other loci of the phase-retarder array. This approach is illustrated by example in FIG. 7, which shows aspects of an example locus 754 of a phase-retarder array of a beam balancer. In this example thermally insulating zone 762 comprises primarily an air gap 763. Spiral, bridge-like supporting structures 764 extend across the air gap, connecting the birefringent-crystal material proximate to locus 754 to the surrounding birefringent crystal 752 of the phase-retarder array. Supporting structures 764 are limited neither in shape nor in number. Rather, the shape and number of supporting structures may be optimized in order to balance the competing objectives of suppressing heat conduction while also ensuring adequate mechanical stability of the phase retarder array. In some examples air gaps 763 may extend all the way through birefringent crystal 752 in a direction parallel to the desired direction of the write beams. In examples of that kind, FIG. 7 represents a simplified plan view of the entry face of the write beams. In other examples, FIG. 7 may represent a plan view of a slice of the birefringent crystal 'cut' parallel to the entry face; in other words, air gaps 763 may not extend all the way through the birefringent crystal in every implementation.

Figure 8:
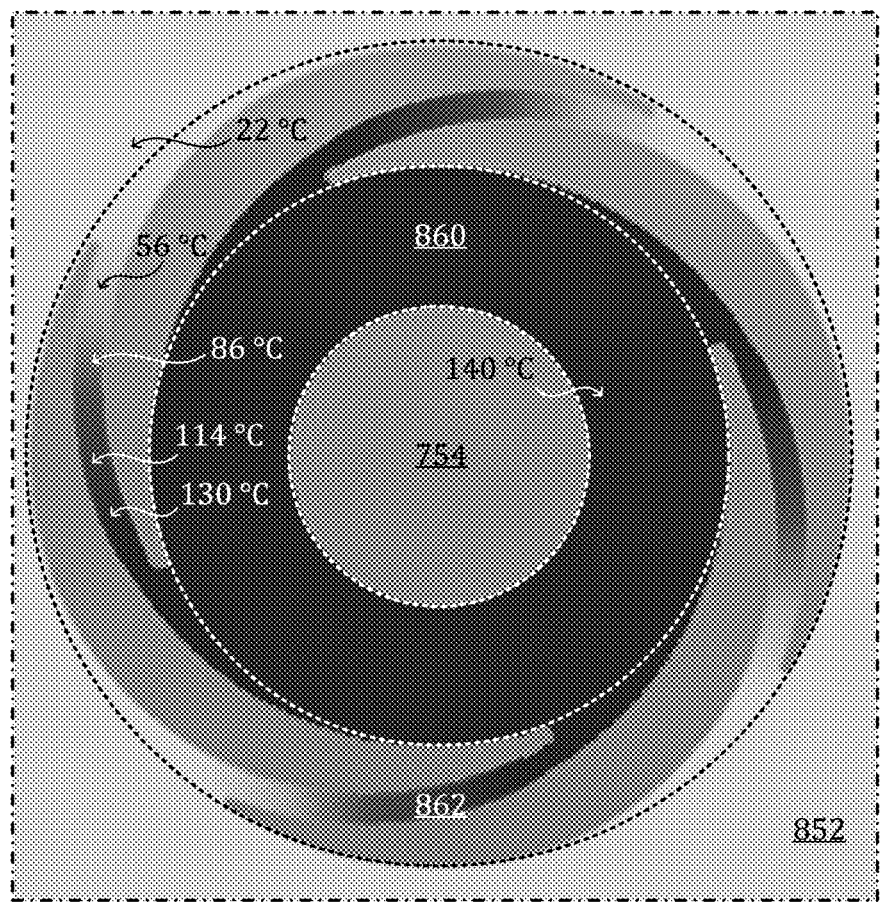
FIG. 8 is a theoretical temperature map of the locus of FIG. 6 computed for example conditions during operation of the beam balancer.

FIG. 8 is a simulated steady-state temperature map corresponding to locus 754 of FIG. 7, under conditions in which the area beneath thin-film resistor 860 is heated to 140° C. and the surrounding crystal is maintained at 22° C. As shown by the temperature gradient along the supporting structures, annular thermally insulating zone 862 limits the rate at which heat from thin-film resistor 860 diffuses to other areas of birefringent crystal 852. This feature greatly simplifies beam-wise phase control in the phase-retarder array.

As noted above, a phase-retarder array can be formed on a single piece of birefringent material, such as quartz or yttrium vanadate. Individual waveplate loci can be etched or laser cut into the material in MEMS fashion. Zero loss at the power-off-state is achieved by cutting the wave-plates to half-wave thickness at the chosen operating wavelength and temperature. Optional thin-film resistors may be deposited, and thermally insulating zones formed, on one or both sides of the birefringent material, with heating current provided via wire bonded connections (665 in FIG. 6). The fabrication process is summarized below, with reference to FIG. 9.

Figure 9:
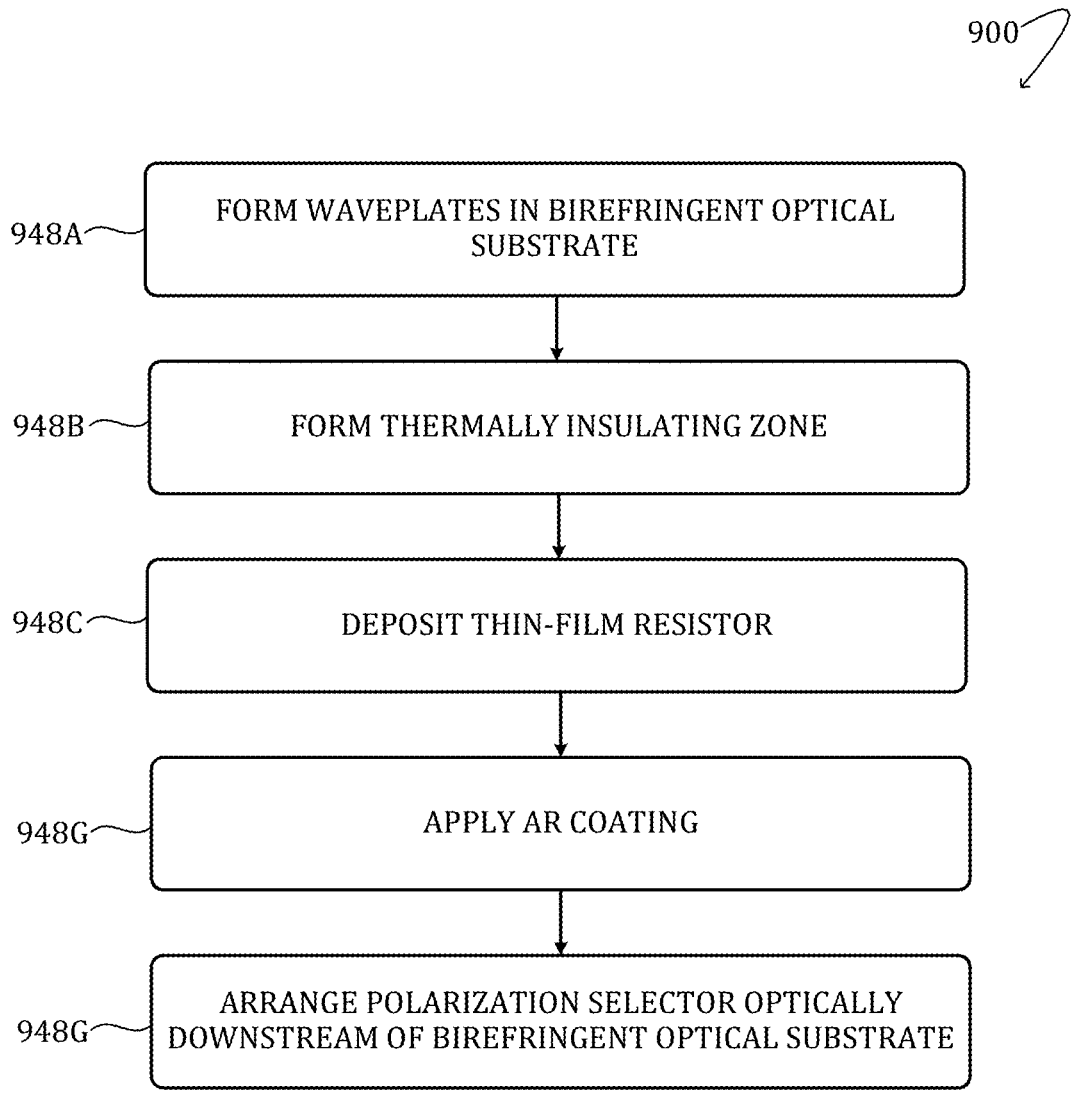
FIG. 9 shows aspects of an example method for making a beam balancer of an optical data writer.

FIG. 9 shows aspects of an example method 900 for making a beam balancer of an optical data writer. At 948A of method 900 a series of MEMS-style, bridge-supported waveplates are formed side-by-side in a birefringent optical substrate. In some examples forming the series of waveplates comprises laser cutting. In some examples forming the series of waveplates comprises etching. In some examples each waveplate of the series is formed at half-wave thickness at a desired operating wavelength and temperature of the beam balancer.

At 948B, for each waveplate of the series, a thermally insulating zone is formed around the area of the thin-film resistor of the waveplate. The thermally insulating zone likewise may be formed via laser cutting, etching, and/or other suitable processing. At 948C, for each waveplate of the series, a thin-film resistor is deposited on at least one side of the birefringent optical substrate, in intimate thermal contact with the waveplate. At 948E an AR coating is applied to the entry face of the phase-retarder array. At 948E a polarization selector is arranged optically downstream of the birefringent optical substrate.

Figure 10:
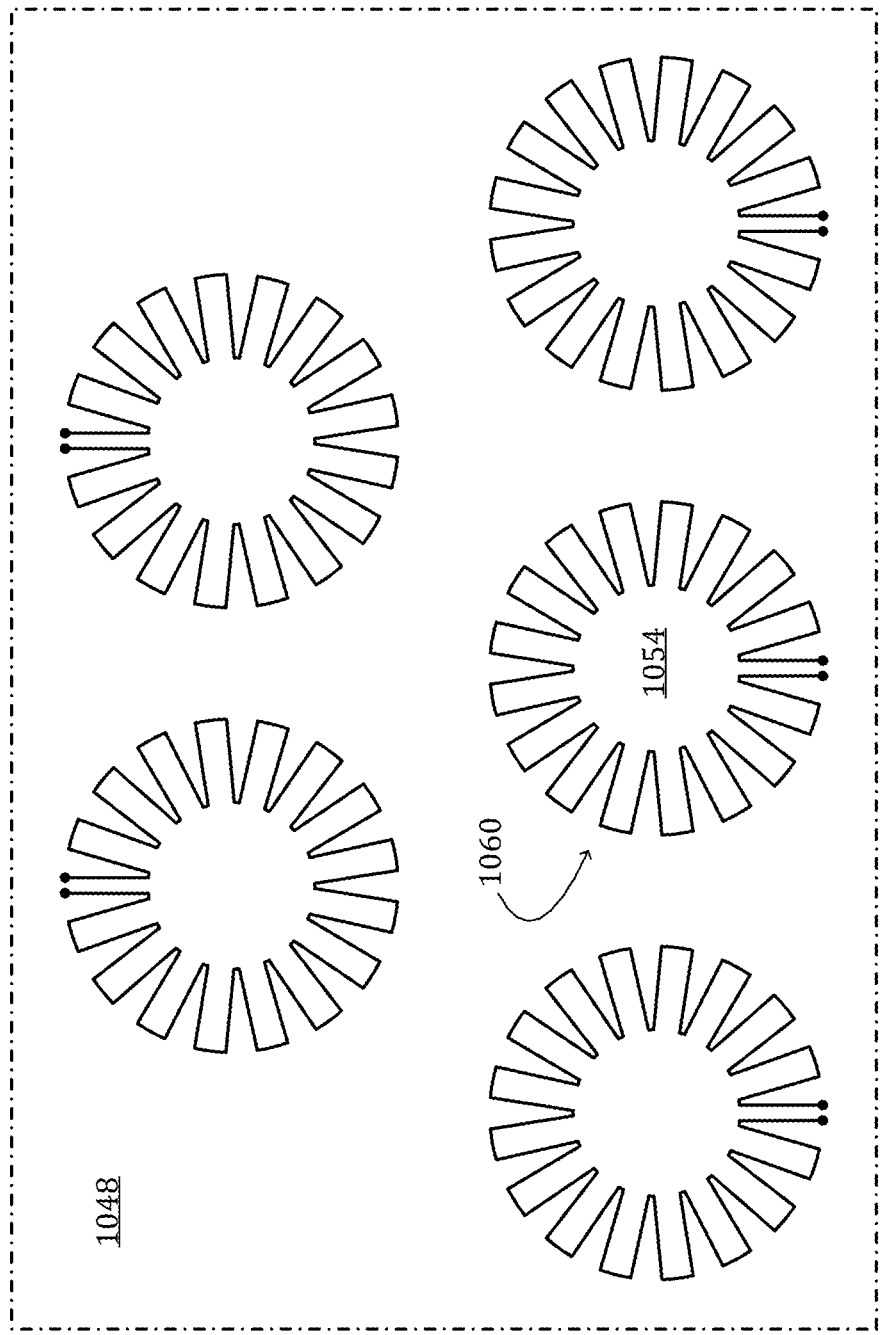
FIG. 10 shows aspects of an example two-row phase-retarder array of a beam balancer.

No aspect of the foregoing drawings or description should be interpreted in a limiting sense, because numerous variations, extensions, and omissions are also envisaged. For instance, while the entire series of write beams may enter a phase-retarder array along a straight line, as shown in FIG. 5, alternative write-beam geometries can be used instead. FIG. 10 shows aspects of an example two-row phase-retarder array 1048 of a beam balancer, with a series of loci 1054 and corresponding series of thin-film resistors 1060. Irrespective of the row configuration, the loci of the phase-retarder array can be densely packed, with inter-locus spacing no greater than the diameters of the respective write beams.

In the description above, structural asymmetries and mechanical tolerances of the beam splitter and associated optical componentry was emphasized as contributing to the pulse-energy tolerance across the series of write beams. However, non-idealities in components optically downstream of the beam splitter may also contribute to the pulse-energy tolerance. Such components include the data modulator and the objective lens system. Even though such components are arranged optically downstream of the beam balancer in the disclosed configurations, the beam balancer may be used to provide compensation for the non-idealities thereof.

The control methods herein may be tied to a computer system of one or more computing devices. Such methods and processes may be implemented as an application program or service, an application programming interface (API), a library, and/or other computer-program product.

Figure 11:
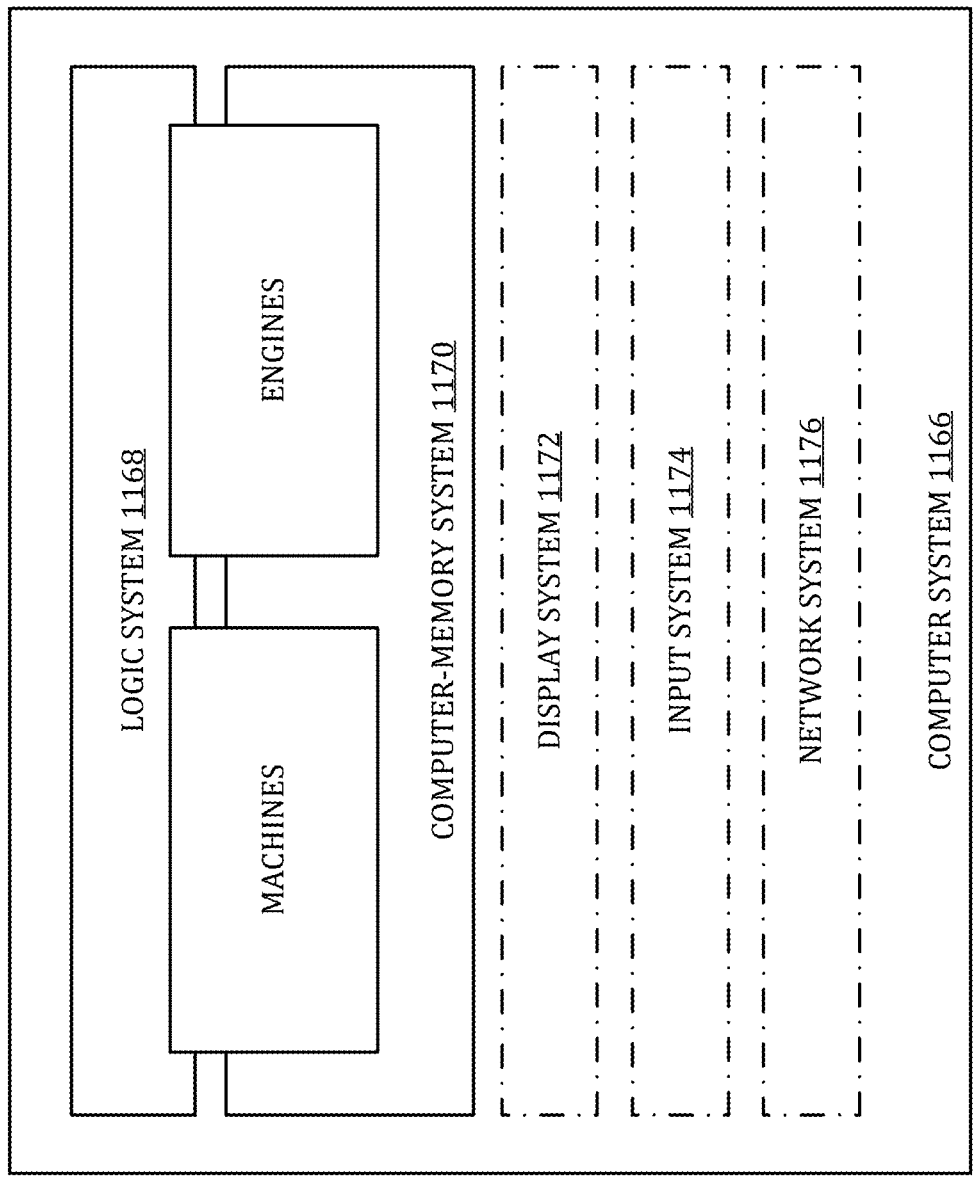
FIG. 11 shows aspects of an example computer system.

FIG. 11 provides a schematic representation of a computer system 1166 configured to provide some or all of the controller, encoder, and decoder functionality disclosed herein. Computer system 1166 may take the form of a personal computer, application-server computer, or any other computing device.

Computer system 1166 includes a logic system 1168 and a computer-memory system 1170. Computer system 1166 may optionally include a display system 1172, an input system 1174, a network system 1176, and/or other systems not shown in the drawings.

Logic system 1168 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 1170 includes at least one physical device configured to temporarily and/or permanently hold computer system information, such as data and instructions executable by logic system 1168. When the computer-memory system includes two or more devices, the devices may be collocated or remotely located. Computer-memory system 1170 may include at least one volatile, nonvolatile, dynamic, static, read/write, read-only, random-access, sequential-access, location-read addressable, file-read addressable, and/or content-read addressable computer-memory device. Computer-memory system 1170 may include at least one removable and/or built-in computer-memory device. When the logic system executes instructions, the state of computer-memory system 1170 may be transformed—e.g., to hold different data.

Aspects of logic system 1168 and computer-memory system 1170 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 1168 and computer-memory system 1170 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 1172 may be used to present a visual representation of data held by computer-memory system 1170. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 1174 may comprise or interface with one or more input devices. An input device may include a sensor device or a user input device. Examples of user input devices include a keyboard, mouse, or touch screen.

When included, network system 1176 may be configured to communicatively couple computer system 1166 with one or more other computer systems. The network system may include wired and/or wireless communication devices compatible with one or more different communication protocols. The network system may be configured for communication via personal-, local- and/or wide-area networks.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

In conclusion, one aspect of this disclosure is directed to a method for balancing pulse energies across a series of write beams in an optical data writer, wherein the pulse energies are equal to within a tolerance. The method comprises: (a) for each write beam of the series, applying an independently controllable phase delay to the write beam, thereby changing a polarization of the write beam; and (b) for each write beam with changed polarization in the series, directing a selected plane-polarized component of the write beam through a data modulator and onto an optical substrate. In this method the data modulator modulates each write beam of the series irrespective of the tolerance.

In some implementations applying the phase delay includes applying electro-optically, acousto-optically, and/or thermo-optically. In some implementations the method further comprises independently controlling the phase delay of each write beam of the series, to compensate for the tolerance. In some implementations the pulse energies of each of the write beams are subject to drift, and controlling the phase delay further compensates for the drift. In some implementations the method further comprises sensing the pulse energies of each write beam of the series, and the phase delay is controlled in a closed-loop manner based on the pulse energies sensed.

Another aspect of this disclosure is directed to an optical data writer comprising a laser, a beam splitter, a beam balancer, a data modulator, and a scanner. The laser is configured to emit pulsed radiation. The beam splitter is configured to divide the pulsed radiation into a series of write beams, and the pulse energies of each of the write beams are equal to within a tolerance. The beam balancer is configured to balance the pulse energies across the series of write beams; it includes a thermo-optical phase-retarder array and a polarization selector. The data modulator is configured to modulate independently the pulse energies of each write beam of the series at a modulation frequency. The scanner is configured to vary a relative position of each write beam of the series relative to an optical substrate.

In some implementations the phase-retarder array comprises a birefringent, uniaxial crystal which is substantially transparent in an emission band of the laser. In some implementations the phase-retarder array comprises quartz and/or yttrium vanadate. In some implementations the series of write beams traverse the phase-retarder array at a corresponding series of loci, and each locus of the series of loci has independent heating. In some implementations the independent heating comprises resistive heating. In some implementations the resistive heating comprises, for each locus of the series of loci, at least one thin-film resistor arranged in intimate thermal contact with the locus. In some implementations the thin-film resistor is an annular thin-film resistor surrounding the locus. In some implementations the optical data writer further comprises a thermally insulating zone surrounding the thin-film resistor. In some implementations the optical data writer further comprises a controller configured to control the independent heating. In some implementations the optical data writer further comprises a sensor responsive to the pulse energies of each write beam of the series, and the controller is configured to control the independent heating in closed loop manner based on an output of the sensor, so as to balance the pulse energies across the series of write beams. In some implementations each write beam of the series delivers a sequence of pulses each having energy greater than five nanojoules, thereby capable of initiating multiphoton absorption in silica glass. In some implementations the pulse energies of each write beam of the series are subject to drift characterized by a drift frequency, and the modulation frequency exceeds the drift frequency by at least four orders of magnitude.

Another aspect of this disclosure is directed to a method for making a beam balancer of an optical data writer. The method comprises: (a) forming a series of waveplates side-by-side in a birefringent optical substrate; (b) for each waveplate of the series, depositing a thin-film resistor on at least one side of the birefringent optical substrate, in intimate thermal contact with the waveplate; (c) for each waveplate of the series, forming a thermally insulating zone around the thin-film resistor of the waveplate; and (d) arranging a polarization selector optically downstream of the birefringent optical substrate.

In some implementations forming the series of waveplates comprises laser cutting or etching. In some implementations each waveplate of the series is formed at half-wave thickness at a desired operating wavelength and temperature of the beam balancer.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for balancing pulse energies across a series of write beams in an optical data writer, wherein the pulse energies are equal to within a tolerance, the method comprising:
for each write beam of the series, applying an independently controllable phase delay to the write beam, thereby changing a polarization of the write beam; and
for each write beam with changed polarization in the series, directing a selected plane-polarized component of the write beam through a data modulator and onto an optical substrate,
wherein the data modulator modulates each write beam of the series irrespective of the tolerance.

2. The method of claim 1 wherein applying the phase delay includes applying electro-optically, acousto-optically, and/or thermo-optically.

3. The method of claim 1 further comprising independently controlling the phase delay of each write beam of the series, to compensate for the tolerance.

4. The method of claim 1 wherein the pulse energies of each of the write beams are subject to drift, and wherein controlling the phase delay further compensates for the drift.

5. The method of claim 1 further comprising sensing the pulse energies of each write beam of the series, wherein the phase delay is controlled in a closed-loop manner based on the pulse energies sensed.

6. An optical data writer comprising:
a laser configured to emit pulsed radiation;
a beam splitter configured to divide the pulsed radiation into a series of write beams, wherein pulse energies of each of the write beams are equal to within a tolerance;
a beam balancer configured to balance the pulse energies across the series of write beams, the beam balancer including a thermo-optical phase-retarder array and a polarization selector;
a data modulator configured to modulate independently the pulse energies of each write beam of the series at a modulation frequency; and
a scanner configured to vary a relative position of each write beam of the series relative to an optical substrate.

7. The optical data writer of claim 6 wherein the phase-retarder array comprises a birefringent, uniaxial crystal which is substantially transparent in an emission band of the laser.

8. The optical data writer of claim 6 wherein the phase-retarder array comprises quartz and/or yttrium vanadate.

9. The optical data writer of claim 6 wherein the series of write beams traverse the phase-retarder array at a corresponding series of loci, and wherein each locus of the series of loci has independent heating.

10. The optical data writer of claim 9 wherein the independent heating comprises resistive heating.

11. The optical data writer of claim 10 wherein the resistive heating comprises, for each locus of the series of loci, at least one thin-film resistor arranged in intimate thermal contact with the locus.

12. The optical data writer of claim 11 wherein the thin-film resistor is an annular thin-film resistor surrounding the locus.

13. The optical data writer of claim 11 further comprising a thermally insulating zone surrounding the thin-film resistor.

14. The optical data writer of claim 9 further comprising a controller configured to control the independent heating.

15. The optical data writer of claim 14 further comprising a sensor responsive to the pulse energies of each write beam of the series, wherein the controller is configured to control the independent heating in closed loop manner based on an output of the sensor, so as to balance the pulse energies across the series of write beams.

16. The optical data writer of claim 6 wherein each write beam of the series delivers a sequence of pulses each having energy greater than five nanojoules, thereby capable of initiating multiphoton absorption in silica glass.

17. The optical data writer of claim 6 wherein the pulse energies of each write beam of the series are subject to drift characterized by a drift frequency, and wherein the modulation frequency exceeds the drift frequency by at least four orders of magnitude.

18. A method for making a beam balancer of an optical data writer, the method comprising:
- forming a series of waveplates side-by-side in a birefringent optical substrate;
- for each waveplate of the series, depositing a thin-film resistor on at least one side of the birefringent optical substrate, in intimate thermal contact with the waveplate;
- for each waveplate of the series, forming a thermally insulating zone around the thin-film resistor of the waveplate; and
- arranging a polarization selector optically downstream of the birefringent optical substrate.

19. The method of claim 18 wherein forming the series of waveplates comprises laser cutting or etching.

20. The method of claim 18 wherein each waveplate of the series is formed at half-wave thickness at a desired operating wavelength and temperature of the beam balancer.

* * * * *